(12) United States Patent
Singh

(10) Patent No.: US 7,930,949 B2
(45) Date of Patent: Apr. 26, 2011

(54) LINEAR MOTION ASSEMBLY WITH MONITORING SYSTEM AND METHOD OF MONITORING

(76) Inventor: Bir Inder Singh, Saginaw, MI (US)

( * ) Notice: Subject to any disclaimer, the term of this patent is extended or adjusted under 35 U.S.C. 154(b) by 765 days.

(21) Appl. No.: 11/910,682

(22) PCT Filed: Apr. 4, 2006

(86) PCT No.: PCT/US2006/012452
§ 371 (c)(1),
(2), (4) Date: Oct. 4, 2007

(87) PCT Pub. No.: WO2006/107938
PCT Pub. Date: Oct. 12, 2006

(65) Prior Publication Data
US 2008/0257080 A1 Oct. 23, 2008

Related U.S. Application Data

(60) Provisional application No. 60/668,216, filed on Apr. 4, 2005.

(51) Int. Cl.
*F16H 27/02* (2006.01)
*F16H 25/00* (2006.01)
*F16H 25/22* (2006.01)

(52) U.S. Cl. .................. 74/89.23; 74/424.71; 74/424.82
(58) Field of Classification Search .................. 74/89.23, 74/424.71, 424.81, 424.82
See application file for complete search history.

(56) References Cited

U.S. PATENT DOCUMENTS
5,670,877 A * 9/1997 Scheiber .................. 324/207.25
2004/0069081 A1 * 4/2004 Clint et al. .................. 74/89.23

* cited by examiner

*Primary Examiner* — Thomas R Hannon
*Assistant Examiner* — Phillip A Johnson
(74) *Attorney, Agent, or Firm* — John D. Wright; Dickinson Wright PLLC

(57) ABSTRACT

A linear motion assembly comprising a first body arranged for operable communication with a second body for translation of the first body and the second body relative to one another. At least one of the two bodies carries a sensor that detects and monitors information related to performance-indicating characteristics of the assembly. A control module is arranged in communication with the sensor and monitors at least one performance-indicating characteristic of the linear motion assembly by monitoring corresponding signals received from the sensor. The control module also detects and provides an indication of a discrepancy in the performance-indicating characteristic.

17 Claims, 15 Drawing Sheets

LINEAR MOTION ASSEMBLY WITH MONITORING SYSTEM AND METHOD OF MONITORING

CROSS-REFERENCES TO RELATED APPLICATIONS

This application claims priority from U.S. provisional patent application Ser. No. 60/668,216, which was filed 4 Apr. 2005 and is in incorporated herein by reference in its entirety.

BACKGROUND OF THE INVENTION

1. Field of the Invention

This invention relates generally to linear motion assemblies and to systems and methods for monitoring performance characteristics of linear motion assemblies.

2. Related Art

Linear motion assemblies, such as lead screws, linear rail and carriage assemblies, and ball screws, are used in the machine tool and aerospace industries to effect linear movement of one body relative to another body. Typically, these assemblies are constructed to have life spans approximating their projected period of use. A ball screw assembly, for example, has a life span that is generally expressed as a function of the number of inch cycles that either the ball screw and/or ball nut will travel under a given load and at a given rotational speed. As such, when a ball screw assembly or any of the other of the assemblies mentioned above is in use, a routine maintenance schedule is generally adopted calling for periodic inspections to determine whether the respective assemblies are functioning properly. Though routine maintenance schedules can prove beneficial in making use of more of the full useful life of the respective assemblies, such schedules do not permit a problem to be detected as the problem is developing in real-time. As such, some of the useful life of the respective assemblies may be unused when replaced, according to schedule, in advance of any unacceptable deterioration. Also, deterioration that occurs in advance of the estimated useful life of assemblies may go undetected until catastrophic failure occurs.

BRIEF DESCRIPTION OF THE DRAWINGS

Some of the objects, features, and advantages of this invention will become readily apparent in view of the following detailed description of the presently preferred embodiments and best mode, appended claims, and accompanying drawings, in which:

DETAILED DESCRIPTION OF THE PREFERRED EMBODIMENTS

Figure 1:
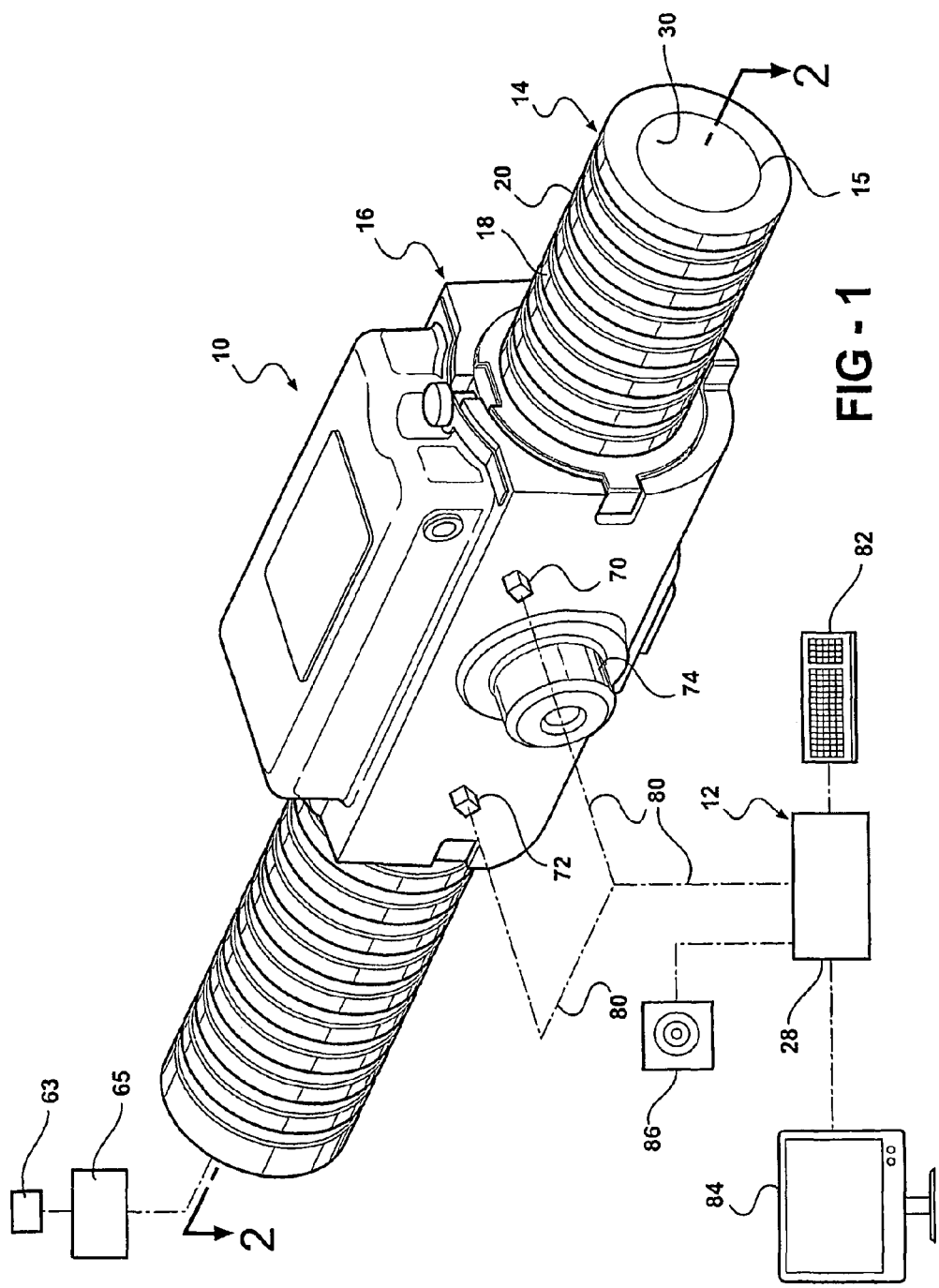
FIG. 1 is a schematic orthogonal view of a ball screw assembly and monitoring system constructed according to a first embodiment of the invention.

A linear motion assembly 10 constructed according to a first embodiment of the invention, and portions of that assembly 10 are shown in FIGS. 1-8. Additional embodiments are generally shown at 110 in FIGS. 11 and 12; at 210 in FIGS. 13 and 14; at 310 in FIG. 15; at 410 in FIGS. 16, 17, and 20; at 510 in FIG. 18; and at 610 in FIG. 19. Reference numerals with the digits 1, 2, 3, 4, 5, or 6 in the hundredth's place indicate alternative configurations of elements that also appear in the first embodiment. Unless indicated otherwise, where a portion of the following description uses a reference numeral to refer to FIGS. 1-8, that portion of the description also applies to elements designated by numerals having the digit 1, 2, 3, 4, 5, or 6 in the hundredth's place.

Figure 2:
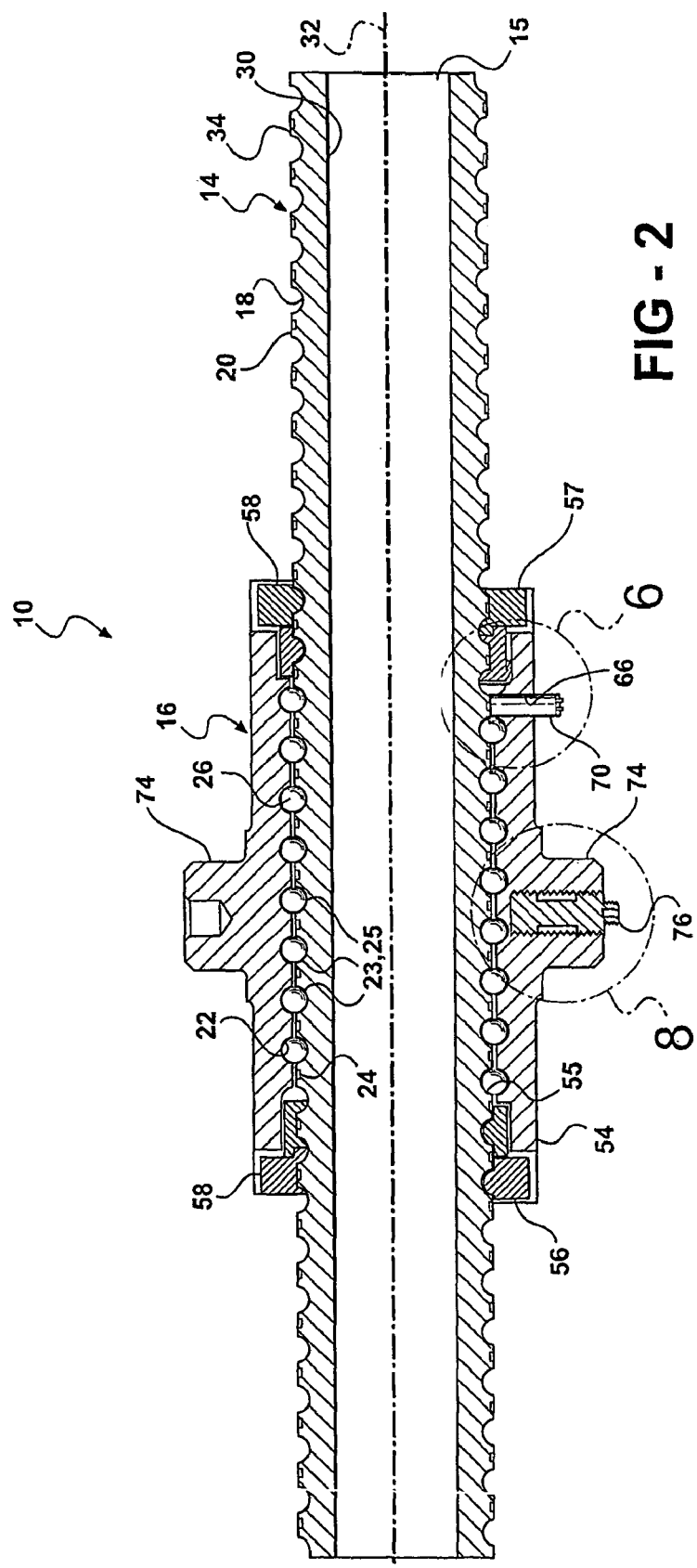
FIG. 2 is a schematic cross-sectional view of the ball screw assembly and monitoring system of FIG. 1 taken along line 2-2 of FIG. 1.
Figure 3:
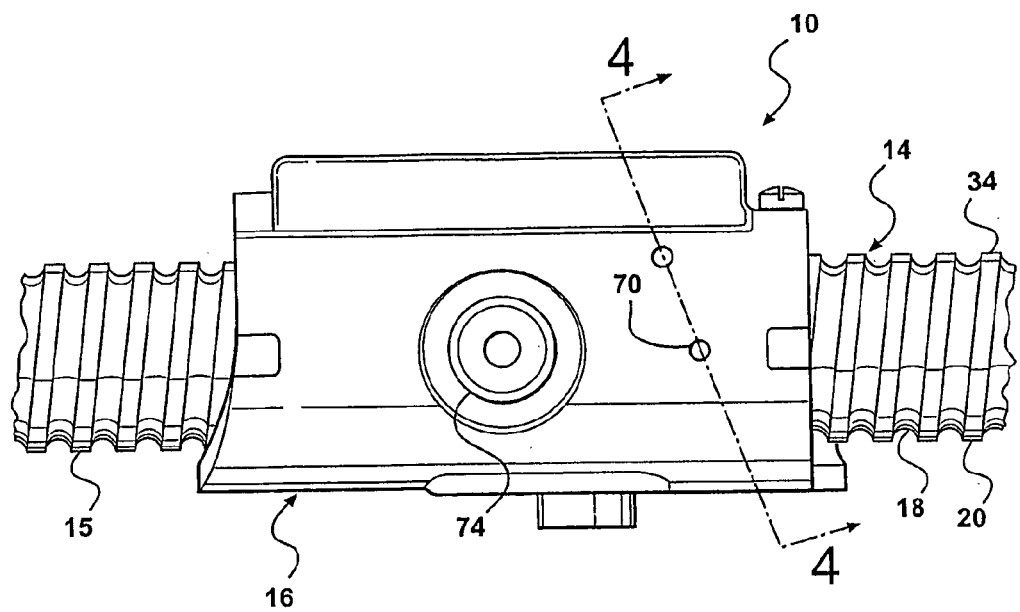
FIG. 3 is schematic elevation view of the assembly and monitoring system of FIG. 1.

The assembly 10 has a first body or elongate ball screw 14 arranged for operable communication with a second body or ball nut 16 for translation of the screw 14 and nut 16 relative to one another. The ball screw 14 includes a generally continuous helical external groove 18 formed in a cylindrical shaft 15 defined by a helical external thread 20, while, as shown in FIG. 2, the ball nut 16 has a generally continuous helical internal groove 22 defined by a helical internal thread 24. The helical groove 22 of the ball nut 16 is adapted for cooperation with the helical groove 18 of the ball screw 14 to transform rotation of either the ball nut 16 or ball screw 14 into linear motion of the other of the ball nut 16 and ball screw 14. The helical grooves 18, 22 define a raceway portion 23 of a ball circulating track 25 for receipt of a plurality of balls 26

(FIG. 2). The balls 26 are free to move along the raceway 23 and circulate around the ball track 25 as the nut 16 and screw 14 rotate and translate relative to one another, resulting in a significant reduction in friction between the nut 16 and the screw 14. The monitoring system 12 is arranged in communication with the assembly 10 so that one or more selected performance-indicating characteristics of the assembly 10 can be monitored in real-time while the assembly 10 is in use.

The monitoring system 12 includes a sensor 70, 72, 76 that is carried by the ball screw 14 and/or the ball nut 16 and is positioned to detect and monitor information related to performance-indicating characteristics of the assembly 10, the ball screw 14, and/or the ball nut 16 and to transmit corresponding signals. The sensor 70, 72, 76 is arranged in communication with at least one signal receiver, such as a control module 28. In the present embodiment the control module 28 is configured to monitor one or more selected performance-indicating characteristics of the ball screw and nut assembly 10 by monitoring corresponding signals received from the sensor 70, 72, 76. The control module 28 is further configured to detect and provide an indication of a discrepancy in the performance-indicating characteristic. Accordingly, as conditions, such as increased lash and/or jamming, for example, arise within the assembly 10, the monitoring system 12 can alert an operator in real-time so that immediate attention can be given to extend the useful life of the assembly 10, or, if necessary, to replace the assembly 10.

In FIG. 2, the ball screw 14 is shown having a hollow core 30 extending along a longitudinal axis 32 of the screw 14 to, at least in part, facilitate weight reduction, which is of particular interest in, for example, aerospace industry applications. In other embodiments the ball screw 14 could be constructed as a generally solid body (not shown), if desired.

Figure 6:
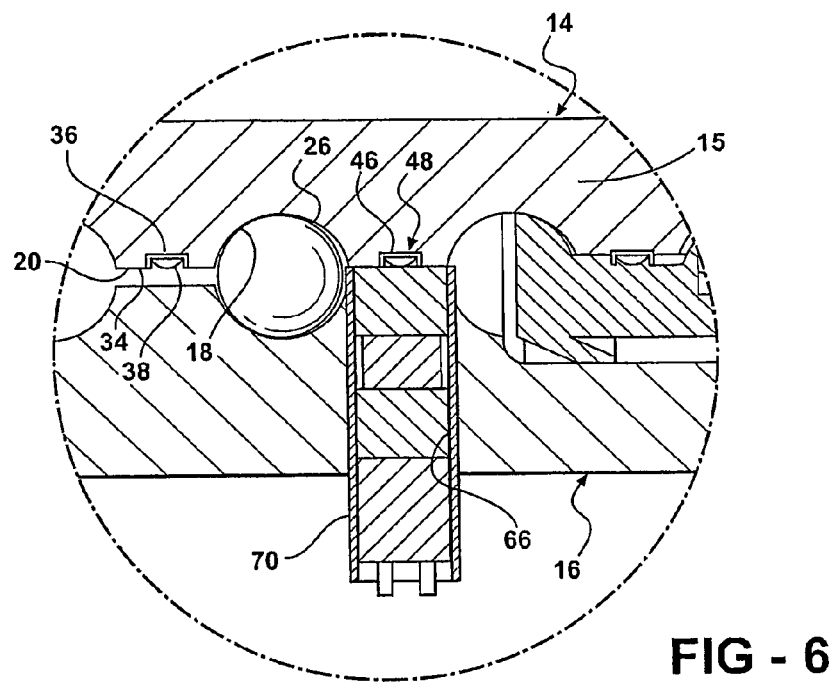
FIG. 6 is schematic enlarged view of the encircled area 6 of FIG. 2.
Figure 7:
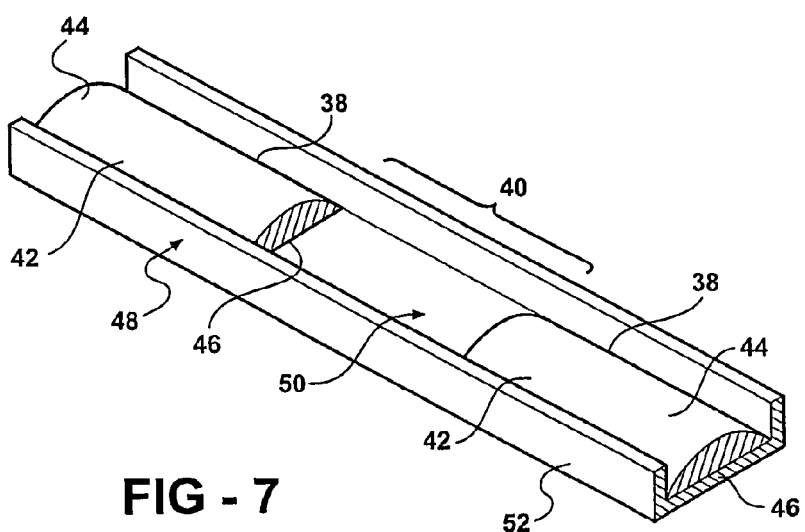
FIG. 7 is a schematic enlarged partial view of a channel with a serrated magnet in the channel.

The external groove 18 of the ball screw 14 is formed having a generally semi-circular or Gothic arch cross-section of suitable radius to accommodate the balls 26 for rotation within and along the groove 18. The external thread 20 extends radially outwardly to an outer surface or land 34 that is preferably a continuous helix, generally flat and parallel to the axis 32. As best shown in FIG. 6, the land 34 may include a continuous helical recess 36. In the present embodiment the recess 36 is generally rectangular in cross-section having a width slightly less than the width of the land 34. The recess 36 is centered within the land 34 and is constructed having a predetermined depth for receipt of an emitter such as a permanent magnet 38 as shown in FIGS. 6 and 7 or an electrical wire (not shown) in electrical communication with a source of electricity, such as may be housed within the hollow core 30 for conjoint rotation with the screw 14. In other embodiments the emitter could be attached to a land 34 that does not include a recess and may include electromagnets in place of or in combination with permanent magnets.

The emitter can be provided as a continuous, flexible magnetic strip that can be formed into a helix within the recess 36 by winding the strip about the land of the external screw thread 20. A suitable magnetic strip would include a serrated magnetic core with a diamagnetic outer layer and would also include a rubber compound impregnated with ceramic magnets or a functional equivalent. Such magnetic strips are commercially available from companies such as Magnum Magnetics of Marietta Ohio. For example, Magnum Magnetics manufactures a conventional through-thickness magnetic pole alignment strip that can be tailored to suit this application. To maximize the sensitivity of the sensor output and axial misalignment detection, the length, width, height, and cross-sectional profile may be customized. In response to the passage of the individual magnets or magnet serrations the sensor generates and sends square-wave pulses to the control module, which the control module may use to calculate axial translation of the nut 16 from a home position and/or screw rotational speed.

Alternatively, as shown in FIG. 7, the emitter can be constructed with a plurality of flexible magnets, preferably of equal size and shape, spaced from one another along the helical land 34. Preferably, spaces 40 of a predetermined equal size are defined between the adjacent magnets 38. The magnets 38 are preferably formed having a convex upper or radially outwardly facing surface 42 defining an apex 44, and having a generally flat lower or radially inwardly facing surface 46 arranged for receipt within the recess 36.

The magnets 38 can be disposed within a housing 48 sized for receipt within the recess 36, if desired. The housing 48 is represented here as being generally U-shaped in lateral cross-section defining an inner channel 50 sized to receive the magnets 38. The housing 48 has an outer surface 52 sized for receipt within the recess 36 in the land 34. The housing 48 is preferably constructed from a dielectric material that is sufficiently malleable or pliable to conform to the helical recess 36. To facilitate maintaining the magnets 38 within the channel 50, a resinous epoxy or other suitable dielectric adhesive can be used to fill the void around the magnets upon being disposed within the channel 50. As such, the housing 48 allows the magnets 38 to be pre-assembled in their relative positions, and thereafter, assembled within the recess 36 of the land 34.

As shown in FIG. 2, the ball nut 16 has an outer surface 54 and may include a through-bore 55 extending between opposite nut ends 56, 57. The through-bore 55 is included to reduce the weight of the assembly, especially for aerospace applications.

Figure 4:
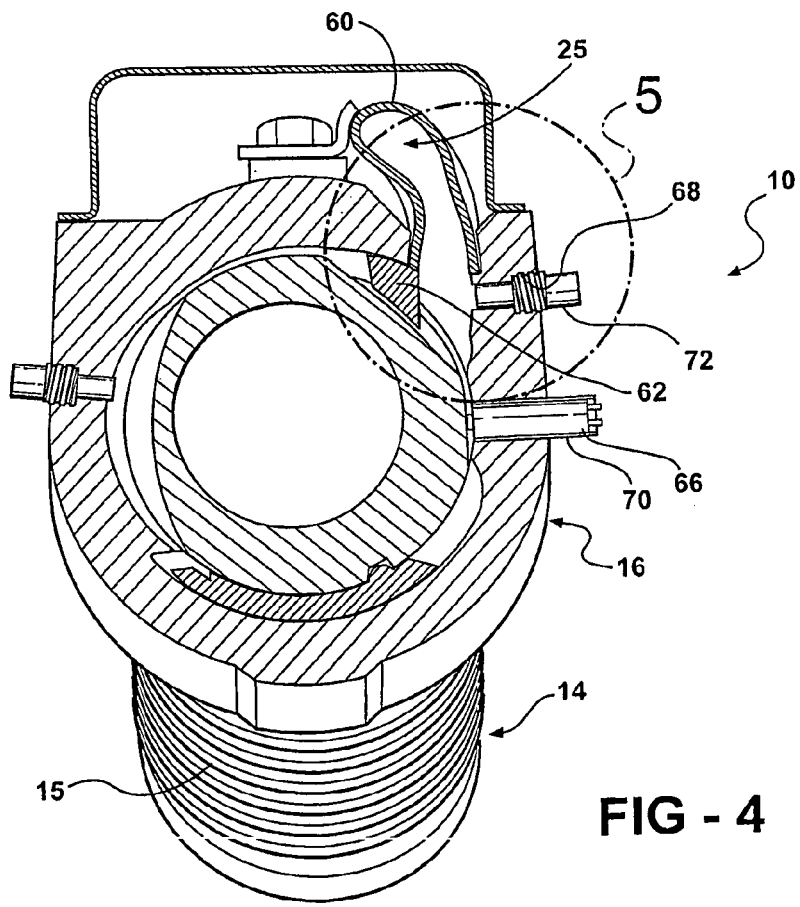
FIG. 4 is a schematic cross-sectional view of the assembly and monitoring system of FIG. 1 taken generally along line 4-4 of FIG. 3.
Figure 5:
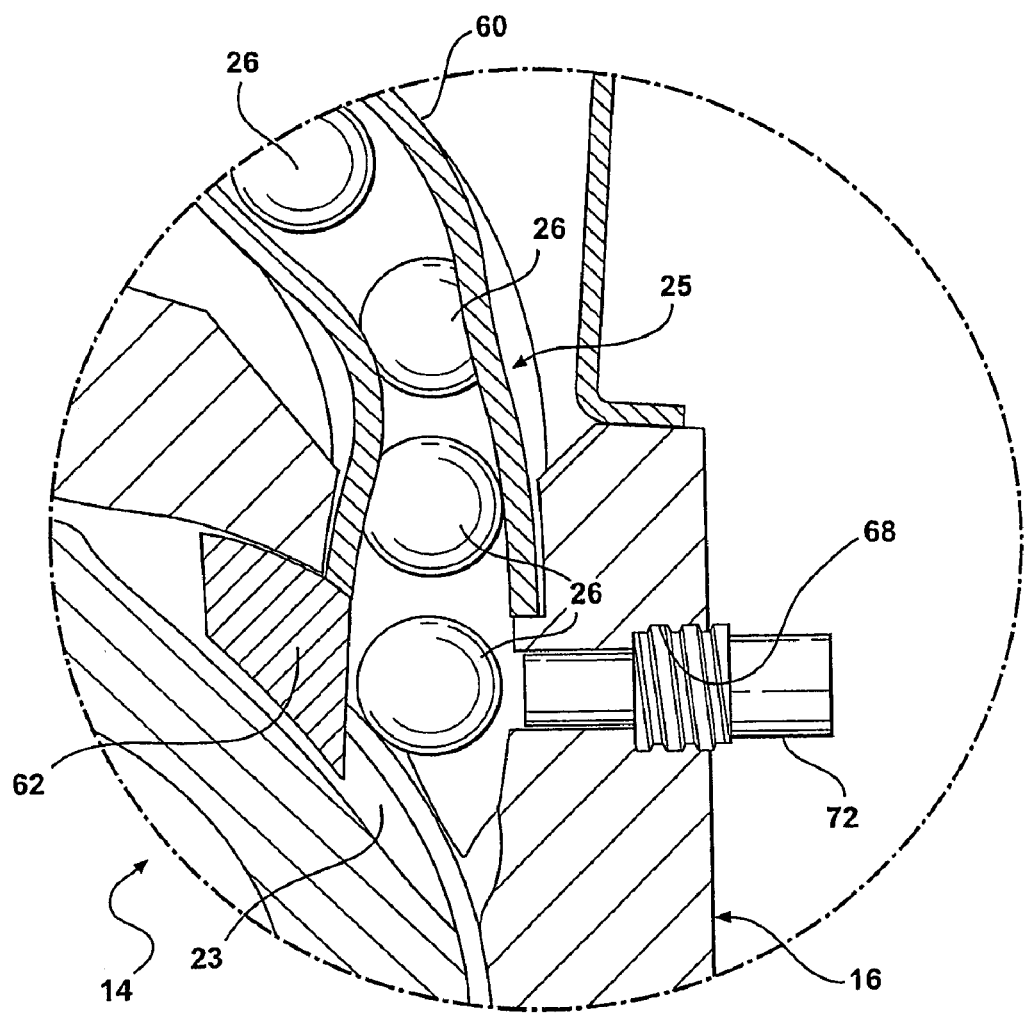
FIG. 5 is a schematic enlarged view of the encircled area 5 of FIG. 4.

The nut ends 56, 57 are preferably arranged to receive wiper and seal assemblies 58 to inhibit lubrication from escaping the ball nut 16 and to inhibit contaminants from entering the ball nut 16. As best shown in FIGS. 4 and 5, the ball circulating track 25 includes at least one ball return 60 and preferably a pair of ball returns 60, with each ball return 60 spanning a number of turns of the helical groove 22 within the ball nut 16. The ball returns 60 have opposite end fingers 62 defining respective ball return inlets arranged to deflect the balls from the raceway into passages of the ball returns 60, and also defining an outlet arranged to return the balls to the raceway to provide a closed loop re-circulation of the balls. The inlet and outlet reverse roles with one another when the direction of rotation of the screw 14 is reversed. The ball returns 60 can be internal, external, or can be provided at opposite ends of the nut 16, as is known.

As shown in FIG. 4, to facilitate incorporating a portion of the monitoring system 12 within the assembly 10, the ball nut 16 preferably has at least one, and, as shown in the embodiment of FIG. 4, two openings 66, 68 extending generally radially between the outer surface 54 and the through-bore 55. A first sensor, such as a wear detecting sensor 70, for example, is mounted in one of the openings 66, and a second sensor, such as a jam, displacement, and/or speed sensor 72, for example, is mounted in another of the openings 68. In other embodiments the ball nut 16 can be constructed having any number of openings to accommodate any number and types of sensors, as desired for an intended application. Preferably the ball screw assembly 10 includes at least two ball circulating tracks and at least one sensor 72 positioned to sense the passage of balls in each ball circulating track 25.

As shown in FIG. 6, the first sensor 70 is arranged for operable communication with the magnets 38 carried by the ball screw 14, to sense magnetic fields emitted by the magnets 38. In the present embodiment the emitter is a series of magnets 38 and the first sensor 70 is a hall-effect sensor, though in other embodiments any suitable pairing of emitter and position sensor could be used.

The sensor 70 detects fields of magnetic flux emitted from the magnets as they pass generally in front of the sensor 70. When the sensor 70 senses the passage of each such field, the sensor 70 transmits to the control module communication device 28 an output signal that may be proportional to the magnitude of the detected magnetic flux. The assembly 10 is generally constructed having a predetermined initial amount of lash or axial play between the ball screw 14 and ball nut 16. The control module 28 is preprogrammed to recognize the initial lash value and to compare the initial lash value to any increase in lash that results during use. In other words, the ball nut-mounted sensor 70 is configured and positioned to detect lash by detecting axial displacement of the ball-screw mounted magnets 38 and the control module 28 is programmed to provide an indication when signals received from the sensor 70 indicate that the corresponding axial displacement of the ball screw 14 relative to the ball nut 16 has reached and/or exceeded a predetermined maximum value.

While in use, the first sensor 70 detects the magnetic flux fields emitted by the magnets 38 as the magnets 38 pass the sensor 70. The field strength sensed and, consequently, the output signal intensity varies proportionally as a function of the relative axial position of the magnets 38 carried by the ball screw 14 to the first sensor 70 carried by the ball nut 16.

The first sensor 70 is preferably initially positioned generally centrally over the apex 44 of the magnets 38, and thus, detects a maximum magnetic flux intensity emitted from the magnets 38. As the ball screw 14 and ball nut 16 shift axially relative to one another the magnets 38 move conjointly with screw 14. As such, as the assembly 10 wears and lash increases, the first sensor 70 detects an emitted magnetic flux that is increasingly and proportionally reduced in magnitude from that sensed when the assembly 10 was first placed in use. The reduced signal intensity detected by the first sensor 70 results from the magnets moving further axially away from the first sensor 70 as the axial play within the assembly 10 increases. The increase in axial play most commonly results due to the ball nut 16 wearing, though wear of the balls 26 and ball screw 14 typically contribute to the increased axial play.

The first sensor 70 transmits a signal to the control module 28 in which the signal is preferably processed and correlated to a predefined amount of axial play. In other words, the control module 28 determines axial displacement of the ball screw 14 in response to changes in sensor signal strength corresponding to changes in the intensity of magnetic fields emitted by the magnets 38.

Figure 10:
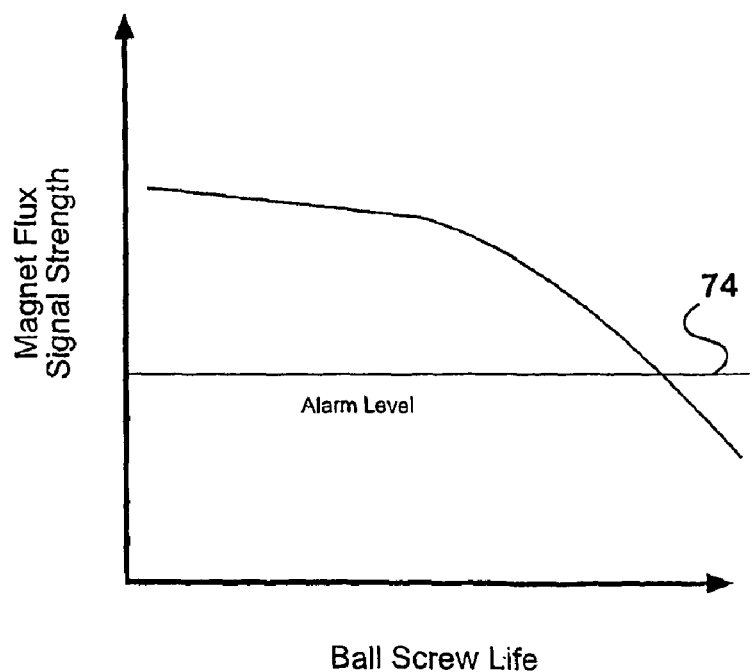
FIG. 10 is a chart showing a sensor output as a function of ball screw assembly life.

As shown in FIG. 10, the signal strength received by the control module 28 can be compared to a predetermined lower limit 74 corresponding to a maximum acceptable range of axial play, which is in turn correlated to a remaining life of the assembly 10. The life may take the form of any desired output value, such as, for example, hours at a given duty cycle, cycles at a given rate, or any other desired units of output. If the signal shows that the assembly 10 has an axial play exceeding the acceptable maximum range, then the operator can be notified, such as through the alarm, or otherwise. As such, the first sensor 70 allows the assembly 10 to be serviced at an optimal time to prevent undue damage to the assembly 10 and associated components.

The first sensor 70 can also be used to detect the axial position of the ball nut 16 relative to the ball screw 14. Preferably, the assembly 10 is mounted with the ball nut 16 in a known initial position or "home position" relative to the ball screw 14. The home position is preferably programmed into the control module 28 to be used as a datum or reference point. In use, as the ball nut 16 traverses linearly along the axis 32 of the ball screw 14, the first sensor 70 detects the number of magnets 38 and spaces 40 or the number of magnetic strip serrations passing in a given direction. The signals received by the first sensor 70 are communicated to the control module 28 in which the axial distance of the ball nut 16 relative to the home position is then calculated. The control module 28 calculates axial distance by taking into account the known helical spatial relation of the magnets 38 relative to one another in combination with the known lead of the ball screw 14. Axial translation=((2*Number of pulses detected−1)/(Number of Pulses for 1 Rev). Accordingly, at any given time, the relative position of the ball nut 16 and ball screw 14 is known. The control module 28 may also be programmed to use this information to calculate axial and/or angular velocity, acceleration, and/or jerk.

As shown in FIG. 5, the second sensor, which may be a jam and/or speed sensor 72, is arranged for operable communication with the balls 26 in the assembly 10 to detect the presence of the balls 26 as they pass in front of the sensor 72. The second sensor 72 is preferably positioned adjacent one of the ends 64 of the ball return 60 to detect the presence of each ball 26 as each ball 26 enters the ball return 60. The second sensor 72 could be located in any suitable position within the ball nut 16, however, most commonly, a ball jam condition originates at one of the ends 64 of the ball return tube 60. Accordingly, a preferred location for at least one jam detecting sensor 72 is adjacent the inlet 64 of the ball return 60.

Figure 9A:
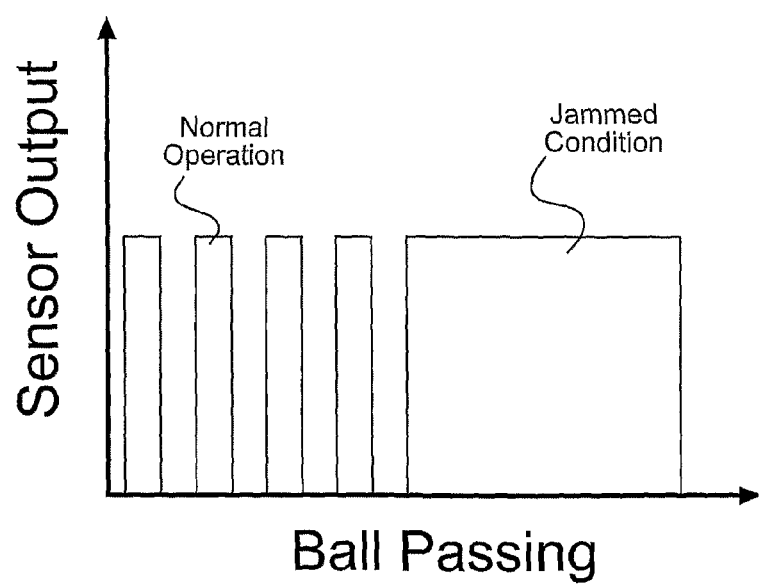
FIG. 9A is a chart showing a sensor output as a function of ball pass frequency in a normal operating condition.
Figure 9B:
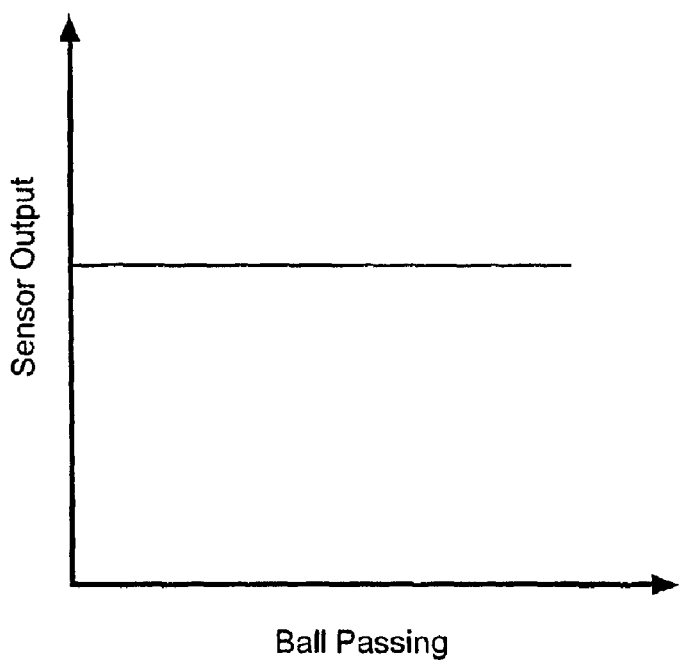
FIG. 9B is a chart showing a sensor output as a function of ball pass frequency in a jammed condition.

When the screw 14 is rotating relative to the nut 16, the second sensor 72 detects the balls 26 as they move in a normal operating condition sequentially past the sensor 72. When it detects the passage of the balls 26, the second sensor 72 transmits a signal to the control module 28 that represents a generally stepped function (FIG. 9A), thereby indicating that the balls 26 are recirculating in a normal mode. If, however, while the screw 14 is rotating relative to the nut 16, the second sensor 72 detects a continual presence of one of the balls 26, the second sensor 72 transmits a constant signal to the control module 28 (FIG. 9B), thereby indicating that the balls 26 are not circulating and that a ball jam condition is present. In other words, the control module is programmed to interpret a constant signal from the sensor as indicating that a ball jam condition is present in the ball circulating track and/or another portion of the ball screw assembly 10.

The control module 28 may be programmed to use signals from the second sensor 72 to calculate and monitor ball pass speed, or translational velocity ($V_e$), which can then be used to calculate the rotational velocity of the ball screw 14. The translational or "exit" velocity ($V_e$) is preferably determined by correlating the frequency of the passing balls 26 to a translational velocity value. It is known that, with a rotating screw, translational velocity of a pitch circle of the balls can be calculated according to the following equation: $V_e = (\pi \times D_{bp} \times V_r)/24 \times [1-(D_b/D_{bp}) \times \cos \Theta]$ Where $D_{bp}$=ball pitch diameter, $V_r$=ball screw rotational velocity, $D_b$=ball diameter, and $\theta$=contact angle. Therefore, with the translational velocity $V_e$ of the balls, the ball pitch diameter $D_{bp}$, the ball diameter $D_b$, and the contact angle $\theta$ all known, the rotational velocity $V_r$ of the ball screw 14 can be calculated. The rotational velocity $V_r$ of the ball screw 14 can then be used to calculate the axial position of the ball nut 16 relative to the screw 14, given that the lead of the ball screw 14 is also known. As such, the second sensor 72, in addition to functioning as a ball jam detector, can be used to determine the relative axial position of the ball screw 14 relative to the ball nut 16. In other words, the second sensor 72 is configured and positioned to detect the passage of balls and the control module 28 may be programmed to calculate ball pass speed in response to a detected frequency of ball passage, the rotational velocity of the ball screw 14 based on the ball pass speed, and the axial position of the ball nut 16 relative to the ball screw 14 based on the rotational velocity of the ball screw 14.

The control module 28 may also be programmed to calculate and monitor ball wear. As the balls wear their diameters decrease. Consequently, the re-circulating balls have to roll faster to cover same distance in the same period of time. Accordingly, the control module 28 is able to calculate and monitor the progressive decrease in the diameters of the balls by continuously or periodically solving the equation $V_e=(\pi \times D_{bp} \times V_r)/24 \times \lfloor 1-(D_b/D_{bp}) \times \cos \Theta \rfloor$ for $D_b$ using current measured exit velocity ($V_e$) values. The control module 28 may also be programmed to alert an operator when the ball diameter value decreases below a predetermined minimum acceptable value.

Other values can be correlated via the second sensor 72 to ensure that the assembly 10 is functioning properly. The control module 28, for example, may be programmed to compare the calculated rotational velocity (RPM) of the ball screw 14 to an actual rotational velocity of the ball screw 14, such as may be determined via another sensor, such as the external sensor shown schematically at 63 in FIG. 1, encoding real-time information from a drive source 65 of the ball screw 14. If the actual rotational velocity and calculated rotational velocity do not match within a predetermined range of acceptable deviation, then a problem may be developing within the assembly 10, or in a component in communication with the assembly 10.

Figure 15:
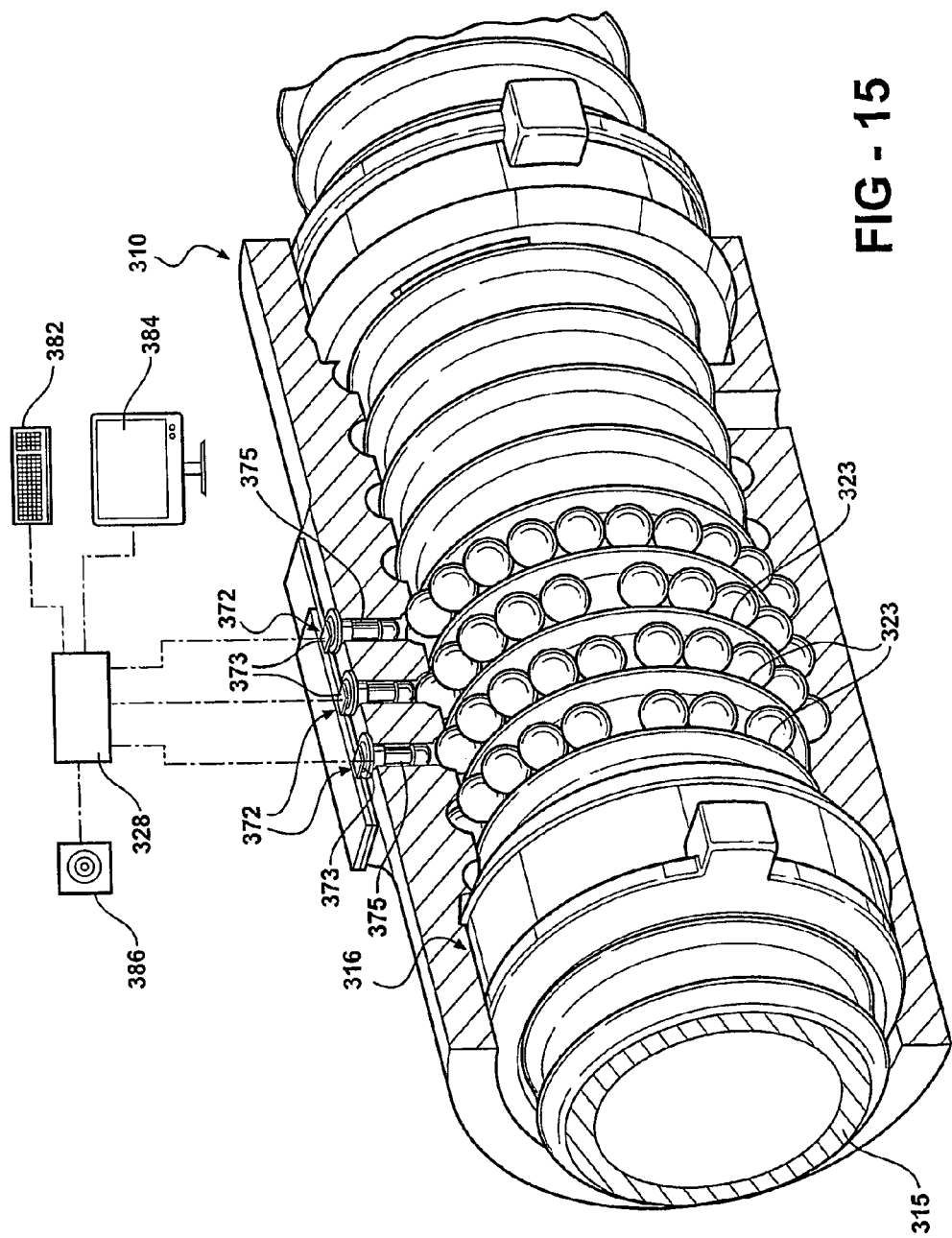
FIG. 15 is a schematic orthogonal view of another embodiment of the invention in which three piezo ball-passage sensors are positioned to sense ball passage in ball raceways of a ball screw assembly.
Figure 16:
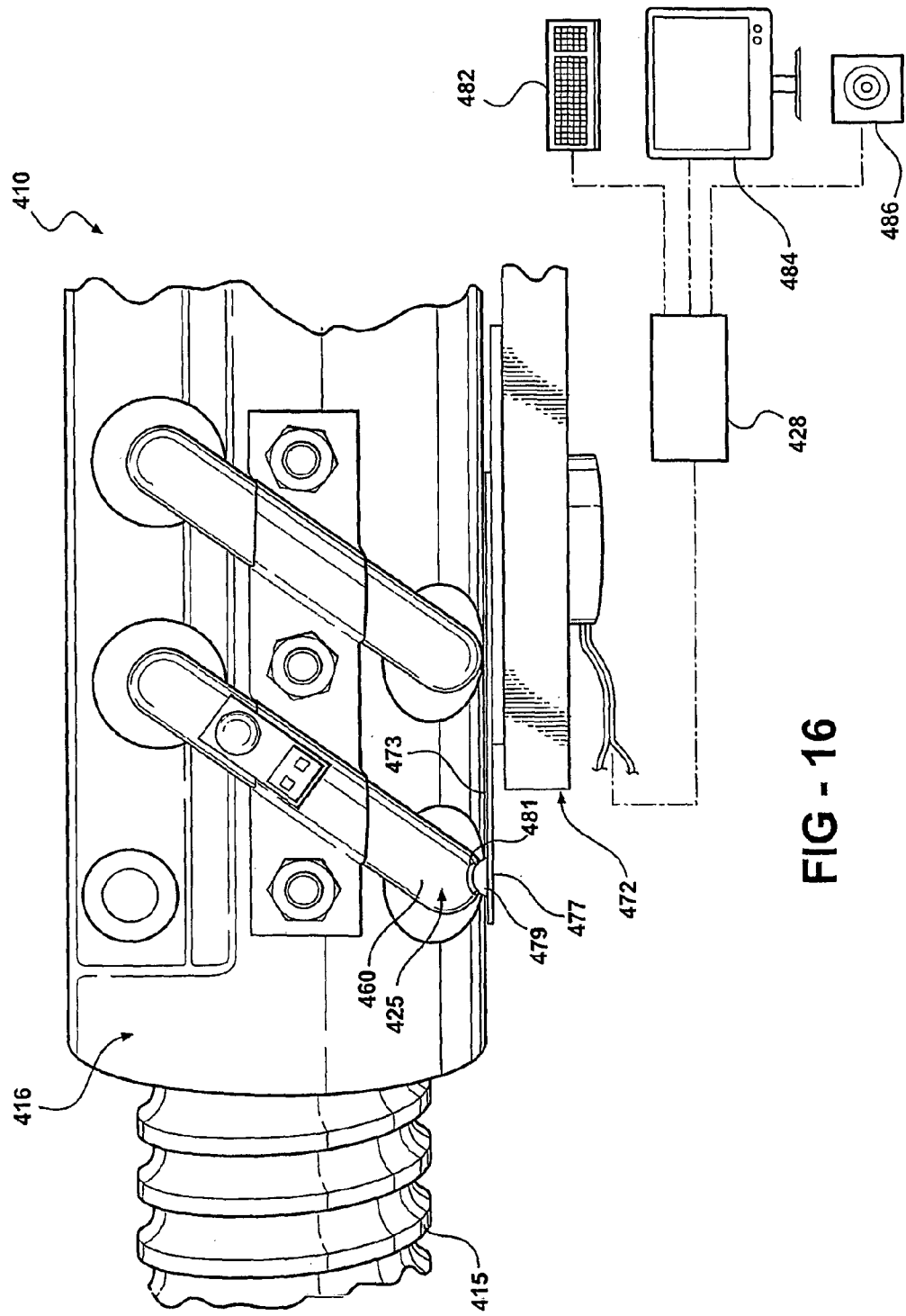
FIG. 16 is a front view of another embodiment of the invention in which a piezo ball-passage sensor is positioned to sense ball passage in a ball return portion of a ball circulating track of a ball screw assembly.

As shown in the embodiments of FIGS. 15 and 16, the second sensor may comprise a piezo transducer 372, 472 including a bimetallic element 373, 473 supported in a position to be slightly deflected by each ball passing the sensor through the ball track 25. The piezo transducer generates a signal when so deflected, and a control module 328, 428 may be configured to interpret a lack of signal as indicating that a ball jam condition is present. Accordingly, no additional power source would be necessary to generate the signals sent from the second sensor 372, 472 to the control module 328, 428.

In the embodiment of FIG. 15 the second sensor 372 is carried by a ball nut 316 of a ballscrew assembly 310 and may be positioned where its bimetallic element 373 will be deflected by the motion of a generally cylindrical plunger 375 received for reciprocal motion in a passage leading to a ball raceway 323. In the embodiment of FIG. 15 three such sensors 372 are included with their bimetallic elements 373 positioned to be deflected by three plungers 375 disposed in three parallel passages leading to the respective raceways 323. As balls travel along the raceways 323 they contact and drive the respective plungers 375 radially outwards, deflecting the respective bimetallic elements 373 and generating corresponding signals that are sent to a control module 328. According to this embodiment the control module 328 is able to individually monitor the ball pass status of a plurality of individual raceways 323 or ball circulating tracks rather than having to infer the status of those raceways 323 based on the status of a single raceway or ball circulating track.

Alternatively, and as shown in FIG. 16, the second sensor 472 may be positioned adjacent a ball return portion 460 of ball circulating track 425 with its bimetallic element 473 carried by a resilient appendage in the form of a steel cantilever 477. A spherical or semi-spherical plunger 479 may be attached at one end of the cantilever 477 and is positioned within an aperture 481 in the ball return 460 where ball passage will cause the cantilever 477 to deflect slightly. Each deflection of the cantilever 477 will cause the bimetallic element 473 carried by the cantilever 477 to generate corresponding signals.

Figure 20:
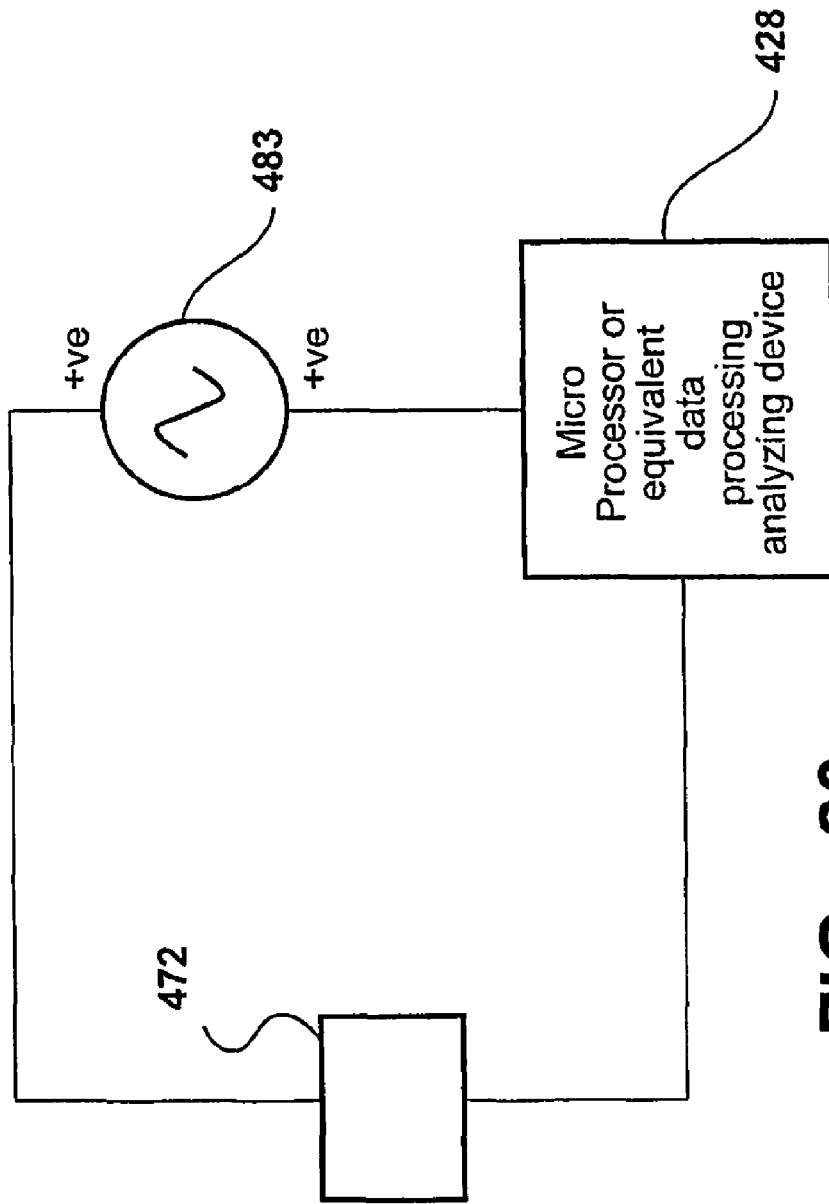
FIG. 20 is a schematic circuit diagram showing a piezo sensor acting as a switch in a ball passage detection circuit.

The signals from the piezo sensor 472 may be sent directly to a control module 428 so that no outside power source will be required to generate the signals. Alternatively, power may be provided to a detection circuit from an outside power source 483 with the piezo transducer 472 acting as a switch in that circuit as shown in FIG. 20. The control module 428 would then be programmed to interpret either a lack of signal or a constant signal as indicating that a ball jam condition is present.

Where the second sensor includes a piezo transducer as shown in the embodiments of FIGS. 15 and 16, the piezo transducer 472 may comprise a solid state switch with the bimetallic element 473 comprising a piezo film carried by a steel strip riveted to a PCB comprising an integrated circuit as shown in FIG. 20. This piezo switch arrangement is commercially available from sources such as Measurement Specialties, Inc and is most appropriate for industrial applications rather than airframe applications since the consequences of lead wire failure due to constant reciprocal movement are less.

Figure 17:
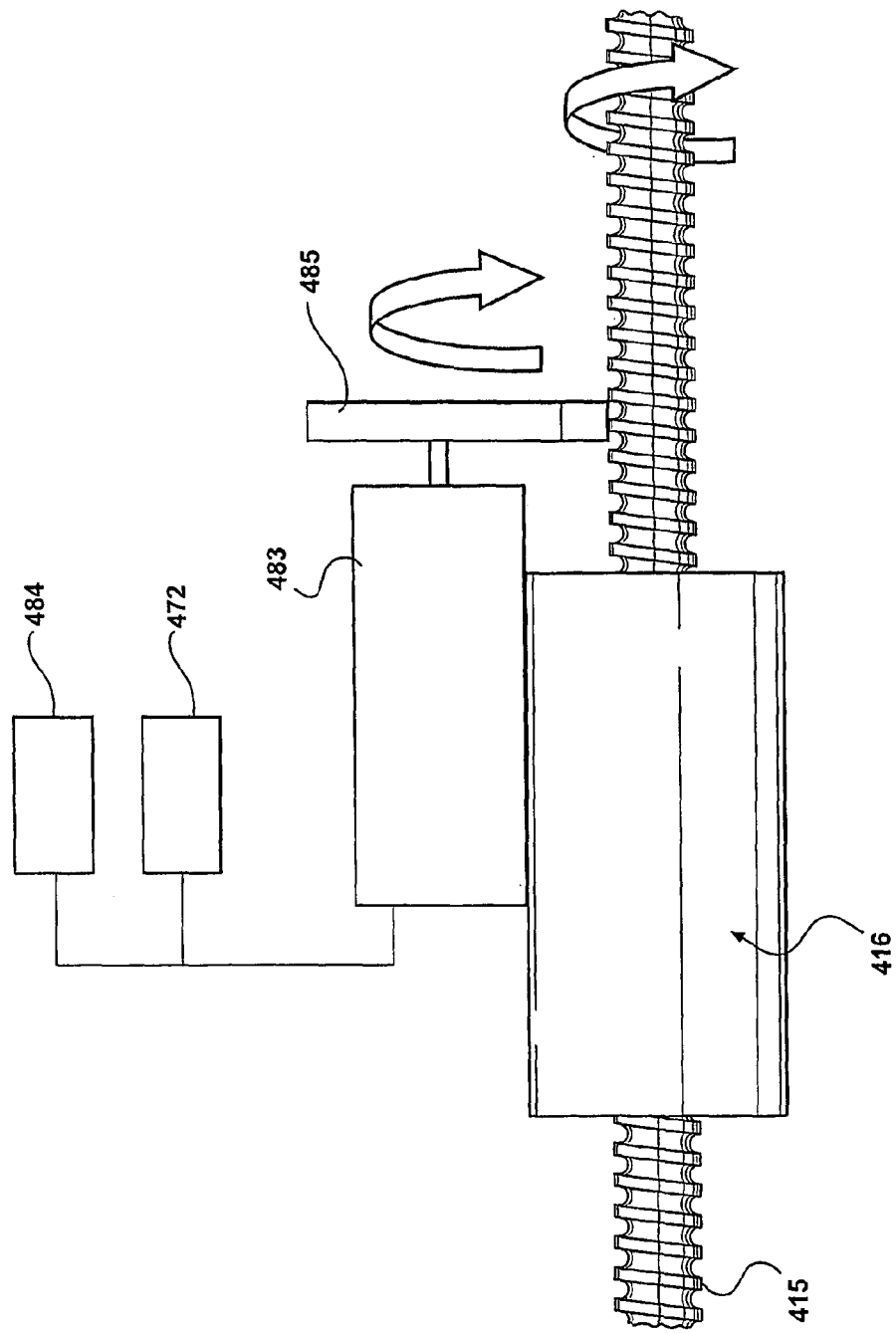
FIG. 17 is a schematic front view of a parasitic electrical power generator supported on the ball nut of a ball screw assembly and driven by rotational motion of the ball screw relative to the ball nut of the assembly.

The power source 483 may include an electrical power generator supported on the nut 416 and connected to the sensor 472 to power the sensor 472 as shown in FIG. 17. The power source may alternatively include a battery or external power supply. The power source 483 may also serve to power other circuit elements 484 such as sensors other than the piezo sensor 472 and/or to charge a battery. The screw 415 is drivingly connected to the electrical power generator 483 through a gear train 485 to rotationally drive the electrical power generator 483. Accordingly, the rotational motion of the screw 425 relative to the nut 416 is used to drive the generator 483. The gear train 485 may include a wheel element that rides on a land of the screw 425 as shown schematically in FIG. 17, or may, alternatively, ride within a groove of the screw 425.

The assembly 10 may alternatively include a sensor power source in the form of a battery supported on the ball nut 16. Preferably the battery would be of the long lasting type such as is available from Securaplane Technologies, Inc.

To reduce power consumption the control module 28 may be programmed to operate in a low-power sleep mode when not receiving signals from the sensor indicating ball motion. The control module 28 may either be carried by the ball nut 16 or a power supply or may be located remote from the ball nut 16. The signal processor 28 processes, digitizes, and analyzes a transducer signal in the form of a square pulse via logical algorithm and is programmed to output an alarm signal to a user interface if and when the algorithm detects a non-periodic signal or completed signal loss. The signal processor may process the signal from the actuator drive or may alternatively process duty cycles. The signal processor may be an Atmel AT91SAM7S64 or may be any other suitable signal processor.

The assembly 10 includes a primary load path defined by the balls, the ball nut 16, and the ball screw 14, with loads being transferred between the ball nut 16 and ball screw 14 via the intervening balls. The assembly 10 may also include a secondary load path defined by a portion of the ball nut 16 that rides on the ball screw 14 when the balls are not present. The control module 28 may be programmed to infer secondary load path engagement in response to detecting failure of the primary load path. More specifically, the control module 28 may be programmed to infer primary load path failure in response to a corresponding signal or lack of signal from a sensor.

Figure 8:
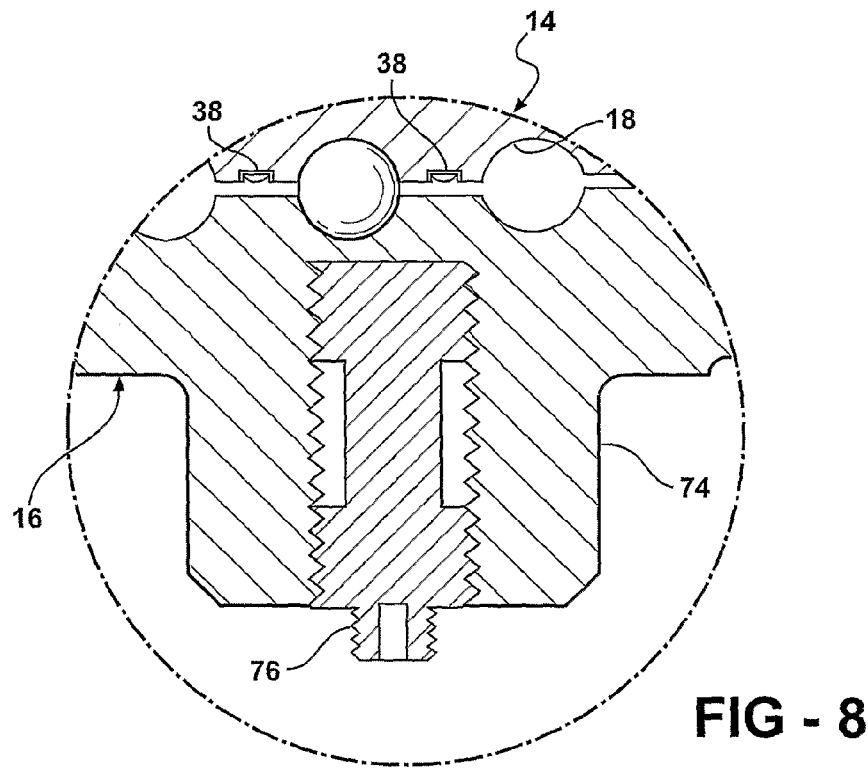
FIG. 8 is a schematic enlarged view of the encircled area 8 of FIG. 2.

As shown in FIG. 1, the ball nut 16 may have at least one, and preferably a pair of diametrically opposite trunnions 74, extending radially outwardly from the outer surface 54 of the ball nut 16. The trunnions 74 allow the ball nut 16 to be mounted for operable communication with a driven member, such as a flap of an aircraft wing assembly (not shown), such that axial travel of the ball nut 16 along the ball screw 14 causes conjoint proportional movement of the flap. The trunnions 14 are constructed having a strength and rigidity capable of withstanding the resultant force imparted between the ball nut 16 and wing assembly. However, as with any flexible body, some deflection results upon encountering an external force. As shown in FIGS. 2 and 8, at least one of the trunnions 74 carries a third sensor, such as a load and/or torque sensor 76. To facilitate mounting the third sensor 76 to the trunnion 74, preferably a bore or opening 78 sized to receive the third sensor 76 is formed coaxially in the trunnion 74. The third sensor 76 is operable to detect any deflection of the trunnion 74 and to communicate a corresponding proportional signal to the control module 28. The signal received by the control module 28 is preferably configured or programmed to calculate force components and a resultant force acting between the ball nut 16 and the member attached to the ball nut 16. The calculated values are then correlated with predetermined expected values for the given operating conditions. Any differences between the calculated values and the expected values can then be used to determine whether or not the assembly 10 is operating in a normally expected capacity.

As represented schematically in FIG. 1, the first, second and third sensors 70, 72, 76 carried by the ball nut 16 are arranged in operable communication, such as via wires 80, with an interface device or receiver such as the control module 28. The communication mechanism between the assembly 10 and the control module 28 could otherwise be wireless, such as through the use of RF signals, or optics. The control module 28 may house a programmable software module that is preferably in operable communication with an information processor. The control module 28 may be in operable communication with at least one communication input device, such as a keyboard 82, so that information may be readily accessed from the control module 28 and/or programmed into the control module 28. The control module 28 may be in operable communication with any number of information receivers and/or transmitters, as desired. For example, the control module 28 may be in communication with an external data display device, such as a computer monitor 84, so that an operator can monitor or receive real-time information regarding the assembly 10 and its associated components. The control module 28 may also be in communication with an audio and/or visual alarm apparatus 86 so that the operator can be notified of a potential problem in the assembly 10 or its associated components.

Figure 11:
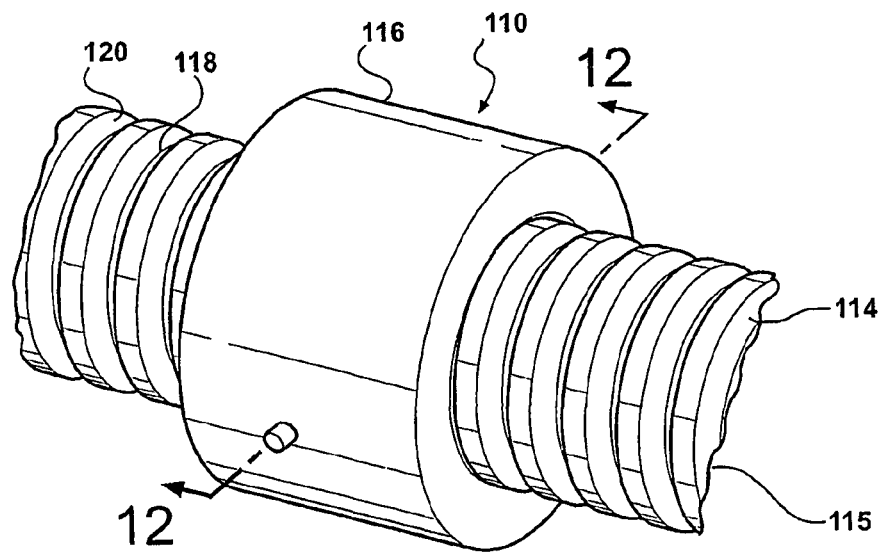
FIG. 11 is a schematic partial orthogonal view of a lead screw and nut assembly and monitoring system constructed according to a second embodiment of the invention.
Figure 12:
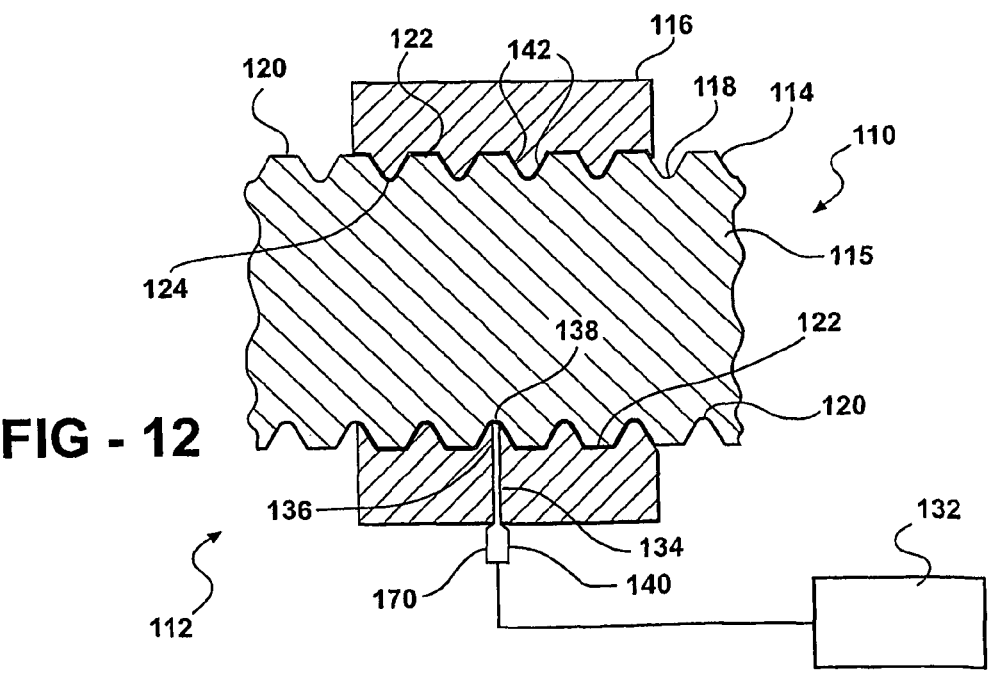
FIG. 12 is a schematic cross-sectional view of the lead screw and nut assembly and monitoring system of FIG. 11 taken along line 12-12 of FIG. 11.

Another embodiment of a linear motion assembly is shown in FIG. 11 in the form of a lead screw assembly 110 arranged for operable communication with a monitoring system 112. The assembly 110 has a first body or elongate lead screw 114 arranged for operable communication with a second body or lead nut 116 for translation of the nut 116 along the lead screw 114. The lead screw 114 has a generally continuous helical external groove 118 defined by a helical external thread 120. The lead nut 116 has an outer surface and a through-bore defining an inner surface. A generally continuous helical internal groove 122 is shown in FIG. 12 as being defined by a helical internal thread formed on the inner surface. The helical internal groove 122 of the lead nut 116 is adapted for cooperation with the helical external thread 120 of the lead screw 114 to permit rotation and translation of the nut 116 along the screw 114 with relatively low frictional impedance resulting between them. The monitoring system 112 is arranged in communication with the lead screw assembly 110 so that one or more selected performance indicating characteristics of the lead screw assembly 110 can be monitored in real-time while the lead screw assembly 110 is in use.

The monitoring system 112 includes at least one sensor 170 carried by at least one of the screw 114 and lead nut 116 for detecting a signal from the other of the screw 114 and nut 116, as described above. The sensor 170 is arranged in communication with at least one signal receiver or control module 132, to facilitate monitoring the selected performance indicating characteristic of the assembly 110, as in the previous embodiment. The sensor 170 is represented here as being carried by the lead nut 116 in an opening 134 extending between the outer surface of the lead nut 116 and the inner surface of the lead nut 116. The sensor 170 is represented as an electromechanical proximity sensor having a plunger 136. A first end 138 of the plunger is arranged for engagement within and to ride along a valley of the external groove 118 in the lead screw 114 and a second end of the plunger is received for reciprocating movement within a plunger housing 140. As such, as the lead nut 116 traverses back and forth along the lead screw 114, the first end of the plunger 136 tends to ride along a valley of the groove 118, and slightly upwardly and downwardly along inclined sides 142 of the screw thread 120 when the nut 116 and screw threads are axially displaced relative to one another in lash, the amount of lash and, consequently, the amount of plunger motion, depending on the condition of the assembly 110. The sensor 170 sends the control module 28 a signal corresponding to the amount of plunger movement and the control module determines the amount of lash based on the signal.

Figure 18:
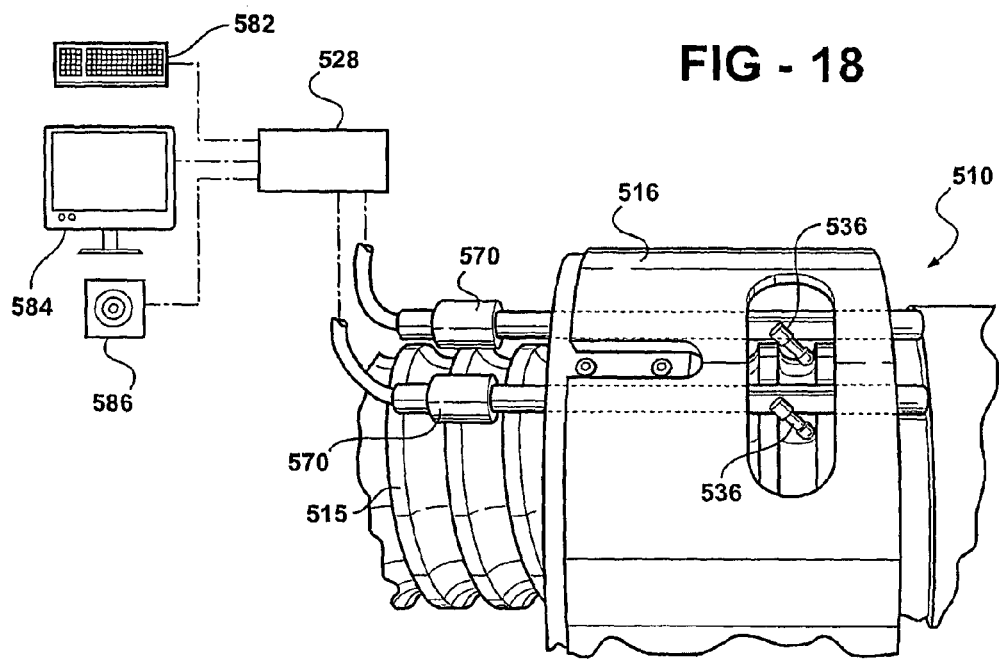
FIG. 18 is a front perspective view of another embodiment of the invention in which two linear potentiometers are carried by a ball nut of a ball screw assembly in a position to sense linear axial displacement of the ball nut relative to a ball screw of the assembly.

The sensor 170 may be a displacement transducer such as a linear potentiometer or LVDT, two of which are shown at 570 in the embodiment of FIG. 18. Such devices carried by a nut 516. The sensors 570 are supported such that linear axial displacement of a screw 515 relative to the nut 516 will cause linear deflection of a pair of plungers 536 which, in turn, will cause linear deflection of the transducer 570. This linear deflection would cause a change in transducer output that a control module 528 can correlate to the degree of linear axial lash Transducers of this type may be obtained from Schaevitz Sensors of Hampton Va.

Figure 19:
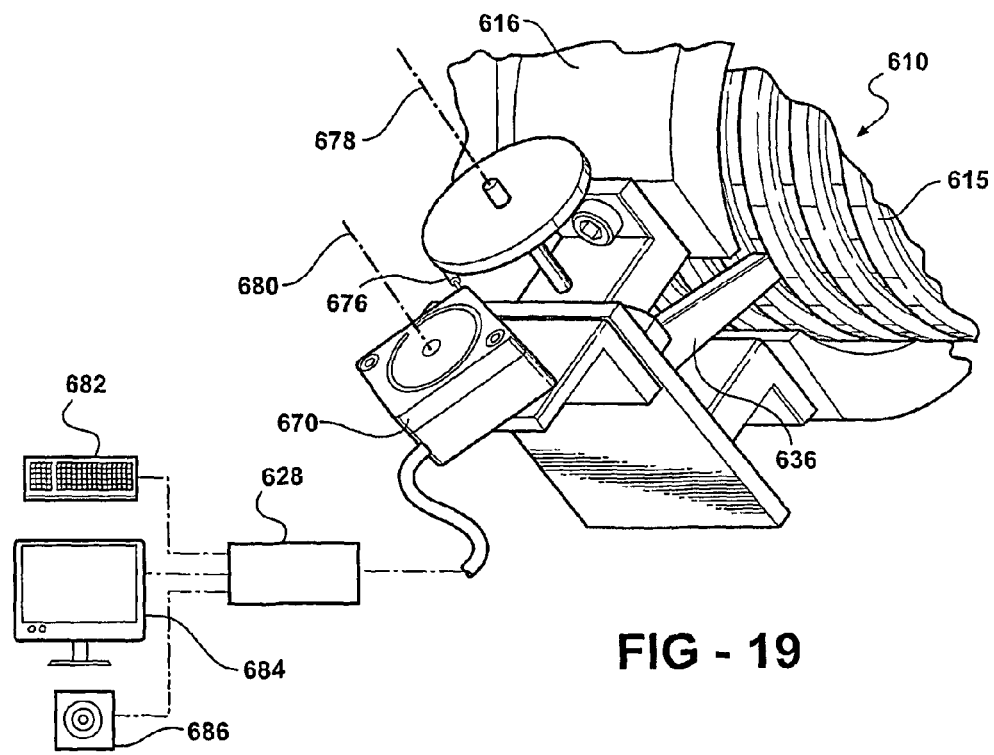
FIG. 19 is an orthogonal view of another embodiment of the invention in which a rotary transducer is supported on a ball nut of a ball screw assembly in a position to sense linear axial displacement of the ball nut relative to a ball screw of the assembly.

The sensor 170 may alternatively be a rotary transducer such as a rotary potentiometer or encoder as shown at 670 in the embodiment of FIG. 19 and as may be obtained from Space Age Control, Inc. of Palmdale Calif. The rotary potentiometer or encoder 670 would be supported such that linear axial displacement of a screw 615 relative to a nut 616 will cause pivotal deflection of a plunger 636 about a plunger axis 678, which will cause a plunger 676 to drive rotation about a transducer axis 680 as shown in FIG. 19. The rotation would cause a change in transducer output that a control module 628 can correlate to the degree of linear axial lash.

In other embodiments, the sensor 170 could be any suitable type of proximity sensor, such as a hall-effect sensor or an optical sensor.

As in the ball screw embodiment of FIGS. 1-8, the lead screw assembly 110 is constructed with a predetermined amount of lash between the lead nut 116 and the lead screw 114. When the assembly 110 is new and first placed in use the lash is at a minimum, and thus, the first end 138 of the plunger 136 tends to remain within the valley of the groove 118. However, as the lash increases through wear of the lead nut 116 and/or the lead screw 114, the first end 138 of the plunger 136 is displaced to ride upwardly along the sides 142 of the thread in proportion to the amount of wear. As such, the sensor 170 sends a signal to the control module 132 proportional in strength to the distance traveled upwardly along the sides 142. The control module 132 is preferably preprogrammed to correlate the signal strength to a performance indicating characteristic, such as the amount of lash or the expected remaining life of the assembly 110.

Figure 13:
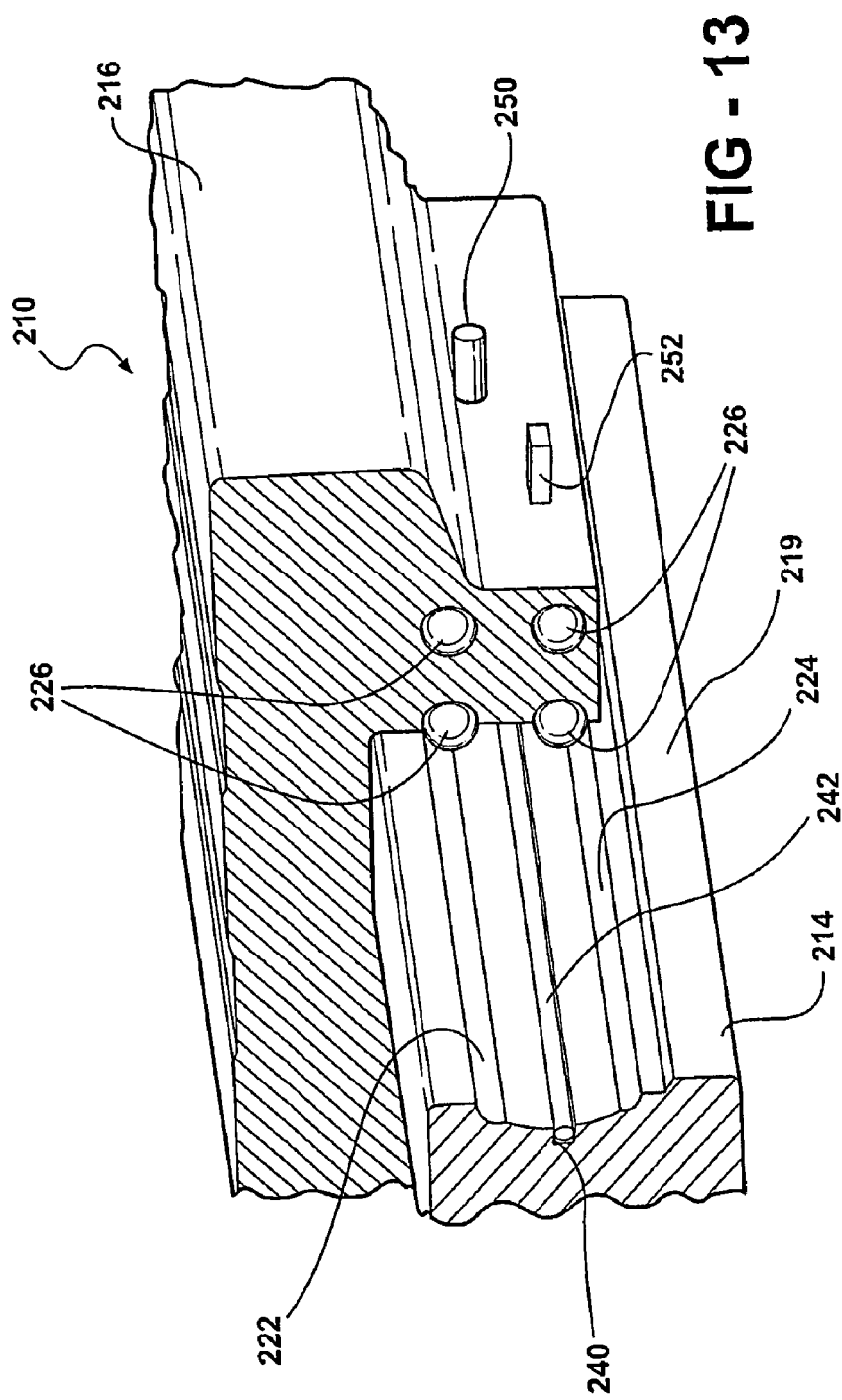
FIG. 13 is a schematic partial orthogonal view of a linear rail and carriage assembly and monitoring system constructed according to a third embodiment of the invention.
Figure 14:
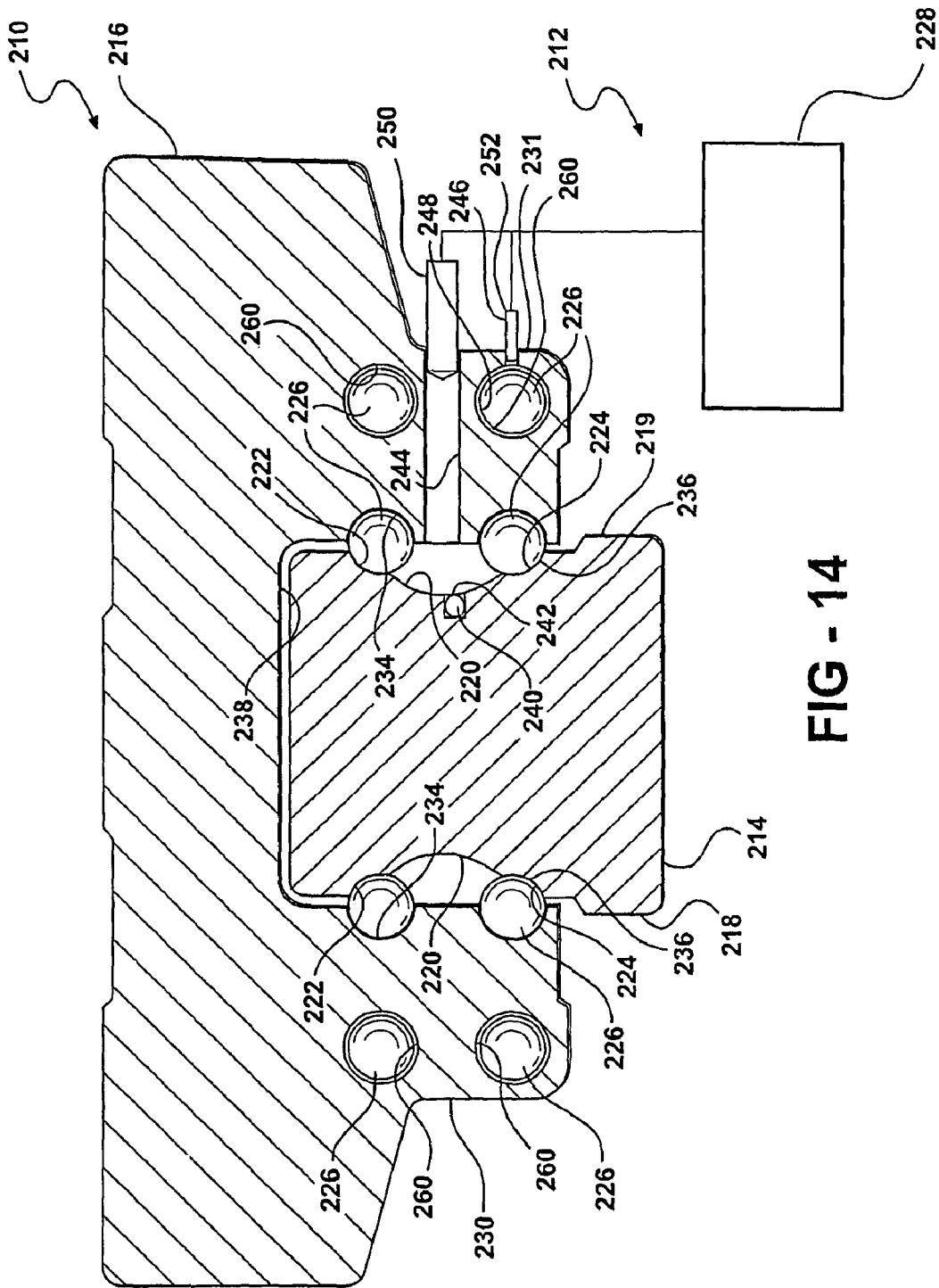
FIG. 14 is a schematic staggered cross-sectional view of the assembly and monitoring system of FIG. 13.

Another embodiment of a linear motion assembly is shown in FIGS. 13 and 14 in the form of a linear rail assembly 210 arranged in operable communication with a monitoring system shown at 212 in FIG. 14. The assembly 210 has a first body or elongate rail 214 arranged for operable communication with a second body or carriage 216 for translation of the carriage 216 along the rail 214. The rail 214 has opposite sides 218, 219 with an elongate recessed rail track extending generally along at least one of the sides, represented here as a recessed rail track 220 extending along a substantial portion of the opposite sides 218, 219. Each of the rail tracks 220 includes upper and lower concave rail raceway portions 222, 224 of respective upper and lower ball circulating tracks and are arranged for rolling engagement with a plurality of balls 226.

The carriage 216 has a recessed pocket shown at 238 in FIG. 14. The recessed pocket 238 is defined in part by a pair of laterally spaced flanges 230, 231. The pocket 238 is sized for at least partial receipt of the rail 214. The carriage 216 is adapted for linear movement along the rail 214. Ball return tubes 260 of the ball circulating tracks are carried by the carriage 216, but in other embodiments may be carried by either the rail 214 or the carriage 216. The balls 226 permit linear translation of the rail 214 and carriage 216 relative to one another with relatively low friction resulting between them.

The ball return tubes 260 are formed within each flange 230, 231. The opposite pairs of raceways 222, 224 each have inwardly facing confronting upper carriage raceway portions 234 and inwardly facing confronting lower carriage raceway portions 236 formed within an inner surface of the flanges 230, 231. The upper and lower carriage raceway portions 234, 236 are arranged for operable communication with the upper and lower rail raceway portions 222, 224 in the rail 214 to define the raceway portions of the ball circulating tracks for the balls 226. Preferably, the balls 226 are preloaded within each of the ball circulating tracks to allow the carriage 216 to be maintained in spaced relation from the rail 214 to allow generally low frictional linear movement of the carriage 216 along the rail 214.

The monitoring system 212 is arranged in communication with the assembly 210 so that one or more selected performance indicating characteristics of the assembly 210 can be monitored in real-time while the assembly 210 is in use. The monitoring system 212 includes at least one sensor carried by at least one of the rail 214 and carriage 216 for detecting a signal from the rail 214 and/or the carriage 216. The sensor 250, 252 is arranged in communication with at least one signal receiver, such as a control module 228, to facilitate monitoring at least one selected performance characteristic of the assembly 210, as in the previous embodiments.

As best shown in FIG. 14, at least one of the sides 219 in the rail 214 is preferably formed with a recess 240 extending substantially the length of the rail 214. The recess 240 is preferably located centrally between the upper and lower raceways 222, 224 and has a predetermined depth for receipt of an emitter, such as a permanent magnet 242 or a wire (not shown) in electrical communication with a source of electricity. The magnet 242 can be provided as a continuous flexible magnetic strip or as a plurality of magnetized segments (not shown), preferably of equal size and shape and spaced from one another within the recess 240 a predetermined distance to define spaces of generally equal size between adjacent segments, as described above in the first embodiment. The magnet or magnets 242 are preferably formed having a convex upper surface defining a peak with a generally flat lower surface arranged for receipt within the recess, as discussed above. The magnets 242 can be received within a housing (not shown) sized for receipt within the recess, as described above.

As shown in FIG. 14, to facilitate incorporating a portion of the monitoring system 212 within the assembly 210, the carriage 216 preferably has at least one opening, but is represented here as having two openings 244, 246. A first one 244 of the two openings 244, 246 extends generally laterally from an outer surface of one of the flanges 231 to an inner surface of that same flange 231. The first opening 244 is preferably located generally centrally between the pair of ball returns 260 in that flange 231. A second opening 246 of the two openings 244, 246 extends generally laterally from the outer surface of the flange 231 to a passage 248 of one of the ball returns 260. A first sensor, such as a wear detecting sensor 250, is mounted in the first opening 244 extending through the flange 231, while a second sensor, such as a jam and/or speed sensor 252, is mounted in the second opening 246 extending into the passage 248 of the ball track.

The first sensor 250 is arranged for operable communication with the magnets 242 in the rail 214 to sense magnetic fields emitted by the magnets 242. In this embodiment the first sensor 250 is a hall-effect sensor, but in other embodiments any suitable proximity sensor could be used. The hall-effect sensor 250 is preferably initially arranged generally centrally over the magnets 242, and thus, is preferably arranged to detect a maximum magnetic flux strength from the peaks of the magnets 242. As the balls 226, rail 214 and carriage 216 wear, the carriage 216 shifts upwardly or downwardly relative to the rail 214, depending on the arrangement of the assembly 210 in its application. Thus, the magnets 242 move generally laterally away from the first sensor 250, thereby causing the first sensor 250 to detect an emitted magnetic flux magnitude that is at least somewhat reduced compared to when the assembly 210 was first placed in use, as discussed previously. As the sensor 250 detects the magnetic flux field emitted from the magnets 242, it provides an output signal to the control module 228 corresponding to the amount of lateral deviation of the sensor 250 from the magnets 242. The control module 228 correlates the strength of the signal to an amount of wear, which can also be correlated to an expected remaining life of the assembly 210, or time until maintenance is required.

The first sensor 250 can also be used to detect the linear position of the carriage 216 relative to the rail 214, generally in the same fashion as described above. Preferably, the assembly 210 is mounted with the carriage 216 in an initial or "home" position in which the position of the carriage 216 relative to the rail 214 is known. The home position is preferably programmed into the control module 228 for reference as a datum. In use, as the carriage 216 traverses linearly along the rail 214 and the first sensor 250 detects the number of magnets 242 and spaces passing by the sensor 250 in a given direction. The signal received by the first sensor 250 is communicated to the control module 228 and the control module 228 calculates the position of the carriage 216 relative to the home position. The linear distance is calculated using the predetermined spatial relation of the magnets 242 relative to one another, thereby allowing the control module 228 to calculate the relative position of the carriage 216 to the rail 214.

The first sensor 250 can also be used to detect the speed of the carriage 216 relative to the rail 214. The sensor 250 detects the frequency at which the magnets 242 are passing, or have passed, and with the distance known between the magnets 242, the control module 228 can be programmed to calculate the speed as a function of time and distance.

The second sensor 252 is arranged for operable communication with the balls 226 in the ball returns 260 of the assembly 210 to detect the presence of the balls 226 as they pass generally in front of the sensor 252. When the carriage 216 is moving relative to the rail 214, the second sensor 252 ordinarily detects the balls 226 as they move sequentially past the sensor 252 and transmits to the control module 228 a corresponding signal that represents a generally stepped function, as described above and shown in FIG. 9A. If, however, while the carriage 216 is moving relative to the rail 214, the second sensor 252 detects a constant signal, as described above and shown in FIG. 9B, indicating that the balls 226 in the respective return 260 of the assembly 210 are not recirculating, an operator is alerted that a ball jam condition is present. The second sensor 252 can also be arranged to monitor the ball pass frequency, which can then be used to calculate the translation speed of the carriage 216 relative to the rail 214, as described above.

In practice, the performance of a linear motion assembly 10 may be monitored by first providing a linear motion assembly 10 including a first body and a second body arranged for operable communication with the first body for translation of the first body and second body relative to one another. A sensor 70, 72, 76 is then mounted on either the first body or the second body in a position to detect information related to at least one of the first and second bodies.

The step of providing a first body and a second body may include providing a ball screw assembly 10 including a ball screw 14 with an external helical groove 18, a ball nut 16 having a through-bore sized for receipt of the ball screw 14 and an internal helical groove 22, the external groove 18 and the internal groove 22 defining a raceway portion 23 of a ball circulating track 25, and the assembly 10 including a plurality of balls carried by a ball circulating track 25, the ball circulating track 25 including a ball return portion carried by one of the ball screw 14 and ball nut 16, the balls being free to circulate around the track 25 as the ball screw 14 and ball nut 16 move relative to one another. In this case the step of mounting a sensor 70, 72, 76 also includes mounting a sensor to either the ball screw 14 or the ball nut 16 in a position to detect information related to the ball screw 14, ball nut 16, and/or the balls.

The step of providing a first body and a second body may, instead, include providing a lead screw assembly 110 having a lead screw 114 with a helical external groove 118 defined by an external thread 120, and a lead nut 116 having a through-bore with a helical internal groove 122 defined by a internal thread, the external thread 120 and the internal thread cooperating with one another to transform rotation of the lead screw 114 or the lead nut 116 into linear motion of the other of the lead screw 114 and lead nut 116. In this case the step of mounting a sensor 170 will include mounting a sensor to at least one of the lead screw 114 and lead nut 116 in a position to detect information related to at least one of the lead screw 114 and lead nut 116.

The step of providing a first body and a second body may, instead, include providing a linear rail assembly 210 including an elongate rail 214 and a carriage 216 supported for translation along the rail 214. In this case the step of mounting a sensor includes mounting a sensor 250, 252 to either the rail 214 or the carriage 216 in a position to detect information related to the rail 214 and/or the carriage 216.

Where the step of providing a first body and a second body includes providing a linear rail assembly 210 as disclosed above, then a further step may be included in which a plurality of balls are provided to be carried by at least one ball circulating track, the ball circulating track including a raceway portion defined between adjacent portions of the rail 214 and carriage 216, and a ball return portion 260 carried by either the rail 214 or the carriage 216, the balls being free to circulate around the ball circulating track as the bodies move relative to one another. The step of mounting a sensor 250, 252 may then include mounting a sensor 250, 252 to at least one of the rail 214 and the carriage 216 in a position to detect information related to the rail 214, the carriage 216, and/or the balls.

The embodiments of the linear motion assemblies and monitoring systems discussed above are intended to illustrate some presently preferred embodiments, and are not limiting. Various modifications within the spirit and scope of the invention will be readily apparent to those skilled in the art. For example, the number and types of sensors may be varied, depending on the nature of the application. In addition, the sensors may be positioned other than as shown. The invention is defined by the claims that follow.

I claim:

1. A linear motion assembly comprising:
   a first body;
   a second body arranged for operable communication with the first body for translation of the first body and the second body relative to one another;
   a sensor carried by at least one of the first body and the second body, the sensor being configured to detect and monitor information related to performance- indicating characteristics of the assembly;
   a control module arranged in communication with the sensor and configured to monitor at least one performance-indicating characteristic of the linear motion assembly by monitoring corresponding signals received from the sensor, and further configured to detect and provide an indication of a discrepancy in the performance-indicating characteristic;
   the assembly includes a plurality of balls carried by at least one ball circulating track;
   the ball circulating track includes:
      a raceway portion defined between adjacent portions of the first and second bodies, and
      a ball return portion carried by one of the first and second bodies, the balls being free to circulate around the track as the bodies move relative to one another;
   the sensor is configured and positioned to detect information related to the balls; and
   in which the control module is programmed to interpret a constant signal from the sensor as indicating that a ball jam condition is present.

2. The linear motion assembly of claim 1 further including an emitter that is supported by one of the first and second body in a position for emissions from the emitter to be detected by the sensor carried by the other of the first and second body.

3. The linear motion assembly of claim 2 in which the emitter includes a magnet and the sensor includes a hall effect sensor configured to detect a magnetic field emitted by the magnet.

4. The linear motion assembly of claim 1 in which the control module is programmed to calculate relative speed between the bodies based on the signals from the sensor.

5. The linear motion assembly of claim 1 in which the control module is programmed to calculate relative acceleration between the bodies based on the signals from the sensor.

6. The linear motion assembly of claim 1 in which the control module is configured to sense wear based on changes in the strength of the signals received from the sensor.

7. The linear motion assembly of claim 1 in which:
   the first body is a screw having a helical external groove defined by a helical external thread;
   the second body is a nut having a through-bore including a helical internal groove defined by a helical internal thread, the external thread and the internal thread cooperating with one another to transform rotation of one of the shaft and the body into linear motion of the other of the shaft and the body; and
   the sensor is carried by at least one of the screw and the nut, the sensor being arranged to detect information related to the other of the screw and the nut.

8. The linear motion assembly of claim 7 in which:
   the sensor is carried by the nut and includes a plunger having a first end configured and positioned to ride along a valley of the external groove of the screw;
   the first end of the plunger is positioned to ride upwardly and downwardly along inclined sides of the screw thread when the nut and screw threads are axially displaced from one another in lash;
   the sensor is configured to send to the control module a signal corresponding to the amount of plunger movement; and the control module is configured to determine the amount of lash based on the signal.

9. The linear motion assembly of claim 7 in which the emitter is carried on the external thread of the screw.

10. The linear motion assembly of claim 9 in which the emitter includes a plurality of magnets that are spaced along the land of the screw thread.

11. The linear motion assembly of claim 9 in which the emitter includes a flexible magnetic strip formed into a helix and carried by and along the land of the screw thread.

12. The linear motion assembly of claim in which:
the first body is a screw having a helical external groove defined by an external thread and the second body is a nut having a through-bore including a helical internal groove defined by an internal thread, the helical internal and external grooves defining the raceway portion of the ball circulating track.

13. The linear motion assembly of claim 1 in which:
the first body is an elongate rail; and
the second body is a carriage supported for translation along the rail.

14. A linear motion assembly comprising:
a first body;
a second body arranged for operable communication with the first body for translation of the first body and the second body relative to one another;
a sensor carried by at least one of the first body and the second body, the sensor being configured to detect and monitor information related to performance-indicating characteristics of the assembly;
a control module arranged in communication with the sensor and configured to monitor at least one performance-indicating characteristic of the linear motion assembly by monitoring corresponding signals received from the sensor, and further configured to detect and provide an indication of a discrepancy in the performance-indicating characteristic; and
in which the assembly includes an electrical power generator supported on the same body as the sensor and connected to the sensor to power the sensor, the other body being drivingly connected to the electrical power generator through a gear train to rotationally drive the electrical power generator.

15. A linear motion assembly comprising:
a first body;
a second body arranged for operable communication with the first body for translation of the first body and the second body relative to one another;
a sensor carried by at least one of the first body and the second body, the sensor being configured to detect and monitor information related to performance-indicating characteristics of the assembly;
a control module arranged in communication with the sensor and configured to monitor at least one performance-indicating characteristic of the linear motion assembly by monitoring corresponding signals received from the sensor, and further configured to detect and provide an indication of a discrepancy in the performance-indicating characteristic;
the assembly includes a plurality of balls carried by at least one ball circulating track:
the ball circulating track includes:
a raceway portion defined between adjacent portions of the first and second bodies, and
a ball return portion carried by one of the first and second bodies, the balls being free to circulate around the track as the bodies move relative to one another;
the sensor is configured and positioned to detect information related to the balls; and;
in which the control module is programmed to calculate and monitor decreasing ball diameters in response to a corresponding increase in ball velocity.

16. The linear motion assembly of claim 15 in which:
the first body is a screw having a helical external groove defined by an external thread and the second body is a nut having a through-bore including a helical internal groove defined by an internal thread, the helical internal and external grooves defining the raceway portion of the ball circulating track.

17. The linear motion assembly of claim 15 in which:
the first body is an elongate rail; and
the second body is a carriage supported for translation along the rail.

* * * * *